United States Patent [19]

Lohmeijer

[11] Patent Number: 4,529,761

[45] Date of Patent: Jul. 16, 1985

[54] POLYPHENYLENE ETHER RESIN COMPOSITIONS

[75] Inventor: Johannes H. G. M. Lohmeijer, Hoogerheide, Netherlands

[73] Assignee: General Electric Company, Selkirk, N.Y.

[21] Appl. No.: 546,138

[22] Filed: Oct. 27, 1983

[30] Foreign Application Priority Data

Oct. 29, 1982 [NL] Netherlands ................. 8204180

[51] Int. Cl.$^3$ .............................................. C08L 71/04
[52] U.S. Cl. ..................................... 524/157; 524/155; 524/158; 524/161; 524/166; 524/167; 524/173; 524/508; 524/540; 524/577; 524/611; 525/132; 525/390; 525/392; 528/212; 528/214; 528/217; 528/218
[58] Field of Search ............... 524/155, 157, 158, 161, 524/166, 167, 173, 508, 540, 577, 611; 525/132, 390, 392; 528/212, 214, 217, 218

[56] References Cited

U.S. PATENT DOCUMENTS

| | | | |
|---|---|---|---|
| 2,733,246 | 11/1955 | Boyd et al. | 524/166 |
| 3,592,879 | 7/1971 | Ott et al. | 524/157 |
| 4,123,475 | 10/1978 | Abolins et al. | 524/158 |
| 4,307,009 | 12/1981 | Luders et al. | 524/157 |
| 4,315,081 | 2/1982 | Kobayashi et al. | 524/166 |
| 4,380,598 | 4/1983 | Robenson et al. | 524/157 |

FOREIGN PATENT DOCUMENTS

| | | | |
|---|---|---|---|
| 0001362 | 1/1979 | Japan | 524/166 |
| 0037154 | 3/1979 | Japan | 524/166 |
| 1078365 | 8/1967 | United Kingdom | 524/157 |

OTHER PUBLICATIONS

Chem. Abstract, vol. 80, No. 6, Feb. 1974.

*Primary Examiner*—Lester L. Lee

[57] ABSTRACT

The present invention deals with polymer blends comprising a polyphenylene ether and optionally polystyrene or a rubber modified polystyrene. It has been found that the addition of an alkyl or aralkyl-sulfonate to such blends improves the environmental stress cracking resistance of such blends.

6 Claims, No Drawings

POLYPHENYLENE ETHER RESIN COMPOSITIONS

This application claims priority from an application first filed in the Netherlands Oct. 29, 1982, Ser. No. 8,204,180. This application is related to copending application Ser. Nos. 546,137 and 546,136 filed concurrently herewith and incorporated herein by reference.

The invention deals with a polymer composition comprising (A) a polyphenylene ether, optionally a polystyrene or a rubber modified high impact polystyrene and and agent to improve the environmental stress crack resistance of the polymer composition.

U.S. Pat. No. 3,361,851 discloses that the addition of a polyolefin to polyphenylene ethers results in the improvement of the resistance to cracking in aggressive solvents.

The present invention resides in the discovery that the addition of a known class of antistatic agents i.e. alkyl- and aralkylsulfonates results in a considerable increase in environmental stress crack resistance.

The polymer composition according to the invention can be characterized in that it comprises as an agent for the improvement of the environmental stress crack resistance 0.5 to 10% by weight of one or more compounds having a formula $R-SO_3X$, in which R represents a alkyl- or aralkylradical with 5 to 25 carbon atoms and X represents an alkali metal ion, preferably sodium. The most frequently occurring failure of thermoplastics during their actual service life is stress cracking. Microcracks are initiated anywhere in the plastic material where the local stress exceeds a certain critical stress level. The latter is considered a material property, $sigma_c$. A microcrack will grow in time into a fatal crack (macroscopie failure) unless it is stopped, e.g. by elastomeric modifiers, or when the crack propagating stresses relax.

It is known, that in presence of certain chemical environments the critical stress level is appreciably reduced giving rise to an increased sensitivity to stress-cracking, called environmental stress cracking (ESC). Known examples are the ESC of polystyrene refrigerator claddings by the freon-blowing agent of the polyurethane insulating-foam and detergent induced cracking of polyethylene.

Critical stress level reduction is larger when the solubility parameters of the thermoplastic and its environment are close, see e.g. R. P. Kambour, J. Pol. Sci., Pol. Phys.II, 1879 (1973) and G. A. Bernier, Macromolecules, 1, 393 (1968).

Polyphenylene ether-polystyrene blends may also suffer some ESC, especially those made self-extinguishing by incorporation of aromatic phosphate flame retardants. It now has been found that the somewhat less advantageous ESC side-effects of such flame retardants can be delayed by additives, which have preference for settling close to or on the sample's surface. Antistatic agents, which are highly polar compounds, have been especially found active.

Polyphenylene ethers are a well known class of compounds. They are sometimes referred to as polyphenylene oxides. Examples of suitable polyphenylene ethers and processes for their preparation can be found in U.S. Pat. Nos. 3,306,874; 3,306,875; 3,257,357 and 3,257,358. Within the context of this invention are included homopolymers, copolymers and graft copolymers obtained by oxidative coupling of phenolic compounds. The preferred polyphenylene ethers as used in this invention comprise units derived of 2,6-dimethyl-phenol.

Polyphenylene ethers are usually blended or reacted with polystyrene and/or rubber modified, high impact polystyrenes (HIPS). As a polystyrene one can use copolymers, graft copolymers and homopolymers comprising units derived from styrene or methylstyrene. The invention also encompasses the use use of such blends or reaction products.

The polymer compositions according to the invention comprise 0.5 to 10% by weight of the environmental stress crack resistance improving agent. This agent is an alkyl or aralkylsulfonate having a formula $R-SO_3X$ in which R represents an alkyl or aralkylradical with 5-25 carbon atoms, preferably 12-20 carbon atoms and X represents an alkali metal ion, preferably a sodium ion. It is also possible to use a mixture of such sulfonates.

Suitable sulfonates are the following products that may be obtained commercially: $C_{12-20}H_{25-40}SO_3Na$ with the trade name Hostastat HS1, $C_xH_{2x+1}SO_3Na$ with the trade name Atmer 190 and $C_{12}H_{25}-C_6H_4-SO_3Na$ with the trade name Maranil A.

The polymer compositions according to the invention may comprise further to the above mentioned components all usual components and additives for such polymer compositions like fillers, reinforcing fillers, flame retardants, plasticizers, dyes and pigments, hydrogenated and non hydrogenated block copolymers, styrene maleic acid anhydride copolymers, polyolefins, inorganic compounds like zinc oxide and zinc sulfide, stabilizers.

The invention will be illustrated by the following examples:

EXAMPLE I

By high speed mixing two separate homogeneous powder samples of 35 parts by weight poly(2,6-dimethyl-1,4-phenylene ether) with intrinsic viscosity in toluene at 25° C. of 0.50 dl/g, 65 parts by weight HIPS, 0.15 parts by weight ZnO, 0.15 parts by weight ZnS, 0.5 parts by weight decyldiphenyl-phosphite, one with (sample A) and the other (sample B) without 3 parts by weight $C_{12-20}H_{25-41}SO_3Na$ have been prepared. They were melt-blended in a twin-screw extruder (WP 28) at 275° C. setting temperature. Extruded strands were chopped into granules, which after homogenizing and drying for 2 hours at 110° C. were injection molded into ASTM type I bars, as used in tensile testing according to ASTM D638. Four such tensile bars of each sample were clamped into a metal jig which had a circular curvature, such as to introduce a 1% strain in the outer surface region of the clamped tensile bars. At time zero, the jig plus clamped bars were immersed in tri-normal-butylphosphate (Tn BP) and the times to macroscopic failure of the four tensile bars were recorded and averaged. If necessary, test duration was extended to 50 minutes, after which it was stopped. The test results have been recorded in Table I.

TABLE I

| Sample | A | B |
|---|---|---|
| Sulfonate | yes | no |
| Properties | | |
| Izod impact, J/m | 180 | 155 |
| Heat Distortion Temp. C.° | 116.5 | 117.5 |
| Environmental Stress Crack Resistance, min. | above 50 | 3.5 |

As can be seen from table A the addition of the sulfonate gives an improvement of the stress crack resistance.

EXAMPLE II

In a similar way in Example I there were prepared test samples with different concentrations of the sulfonate. All samples comprised 60 parts by weight of the same poly(2,6-dimethyl-1,4-phenylene ether) as used in Example I, 40 parts by weight of high impact polystyrene, 0.30 parts by weight of ZnO+ZnS, 12.5 parts by weight of organic phosphates, 0.5 parts by weight organic phosphites, 4 parts by weight $TiO_2$, 0.04 Yellow 1090 pigment and 0.002 parts by weight Red 5 B pigment. Samples D, E, F, G, H, I comprised a sulfonate according to the invention whereas sample C serves as a blank.

The environmental stress crack resistance (ESCR) was determined for all samples in the same way as indicated in example I. The results can be found in table II.

TABLE II

| Sample | C | D | E | F | G | H | I |
|---|---|---|---|---|---|---|---|
| $C_{12-20}H_{25-41}SO_3Na$ (Parts by weight) | — | 1 | 2 | 3 | — | — | — |
| $C_xH_{2x+1}SO_3Na$ (Atmer 190) | — | — | — | — | 1 | 2 | 3 |
| Properties | | | | | | | |
| Izod impact, J/m | 145 | 150 | 165 | 245 | 165 | 170 | 205 |
| Heat Distortion Temp. °C. | 106 | 103 | 104 | 106 | 102 | 107 | 106 |
| ESCR, seconds | 69 | 96 | 128 | 344 | 105 | 146 | 360 |

The results of table II demonstrate that the addition of a sulfonate results in an improvement in environmental stress crack resistance.

I claim:

1. A polymer composition exhibiting improved environmental stress crack resistance, consisting essentially of:
    (a) a thermoplastic resin base polymer selected from the group consisting of polyphenylene ether resins and polyphenylene ether modified with alkenyl aromatic resins; and
    (b) an amount of environmental stress crack resistance agent effective for improving the environmental stress crack resistance of said thermoplastic resin wherein said agent is a compound of the formula R—$SO_3$X wherein R represents an alkyl or aralkyl radical having 5 to 25 carbon atoms and X represents an alkali metal ion.

2. A polymer composition as in claim 1 wherein said environmental stress crack resistance agent is present in an amount of 0.5 to 10.0% by weight of the thermoplastic resin.

3. A polymer composition as in claim 1 wherein said agent is a mixture of compounds having the formula R—$SO_3$X and R represents alkyl radicals having 12 to 20 carbon atoms and X is a sodium ion.

4. A polymer composition as in claim 1 wherein said polyphenylene ether resin is poly(2,6-dimethyl-1,4-phenylene)ether.

5. A polymer composition as in claim 1 wherein said alkenyl aromatic resin is high impact polystyrene.

6. A method for improving the environmental stress crack resistance of a polymer composition comprising the steps of:
    mixing a thermoplastic resin based polymer selected from the group consisting of polyphenylene ether resins and polyphenylene ether modified alkenyl aromatic resins with an environmental stress crack improving amount of a stress improving agent having the formula R—$SO_3$X wherein R is alkyl or aralkyl radical having 5–25 carbon atoms and X is a alkali metal ion thereby providing a stress crack resistant polymer composition;
    molding said polymer composition into a shaped article exhibiting improved environmental stress crack resistance.

* * * * *